United States Patent Office 2,759,646
Patented Aug. 21, 1956

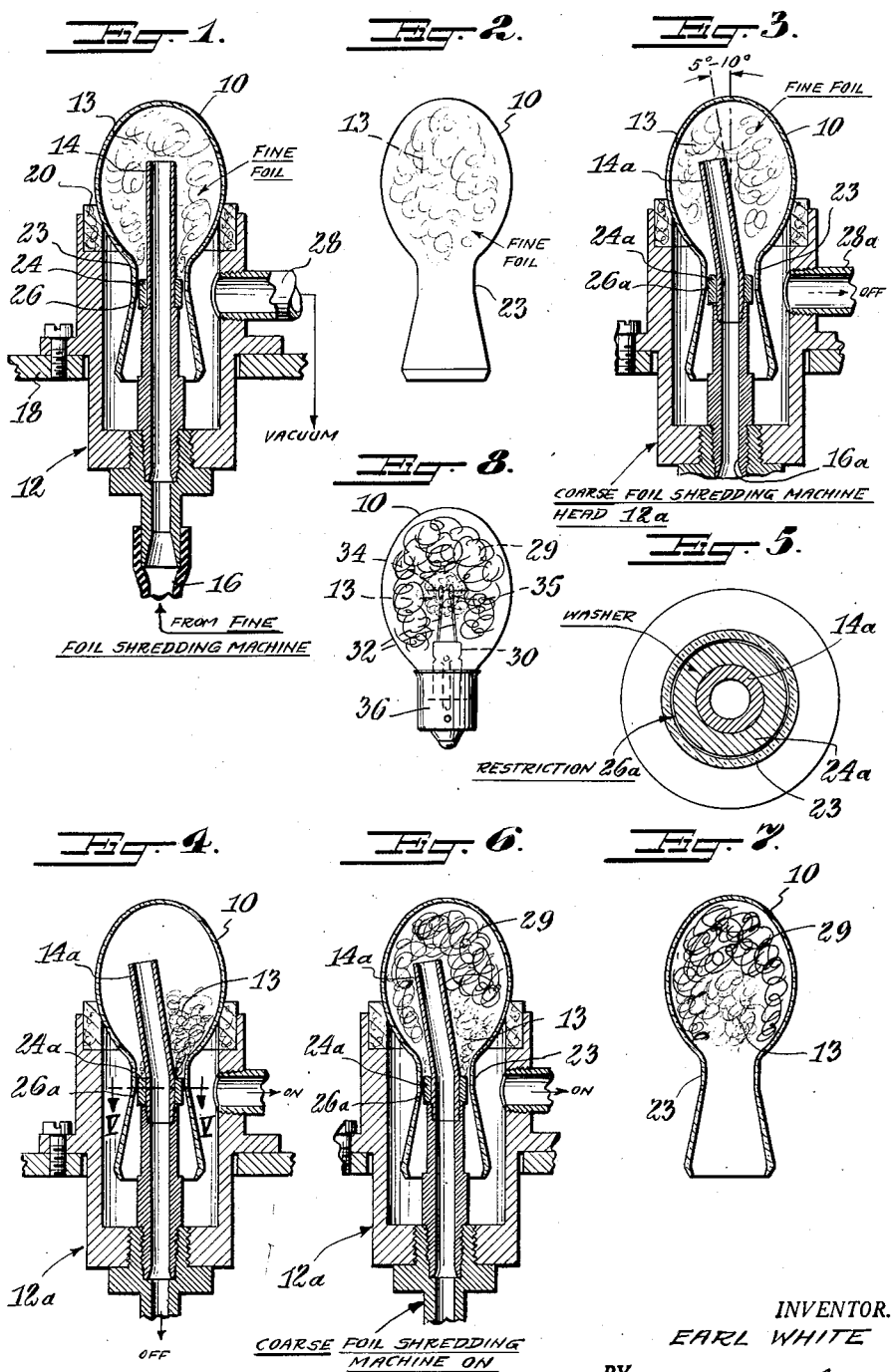

2,759,646

METHOD AND APPARATUS FOR LOADING FLASH LAMPS

Earl White, Pulaski County, Ark., assignor to Westinghouse Electric Corporation, East Pittsburgh, Pa., a corporation of Pennsylvania Application March 31, 1955, Serial No. 498,266

8 Claims. (Cl. 226—19)

This invention relates to a method and apparatus for loading flash lamps and, more particularly, to a method and apparatus for loading photoflash lamp enevlopes with foil of two different sizes.

In so-called focal-plane cameras the total exposure time is greatly increased over the total exposure time for the usual shutter type cameras and photoflash lamps for use with focal-plane cameras must provide a flash of relatively long duration and uniform intensity. In order to achieve such a relatively long and uniform flash, two sizes of foil are utilized. A coarse foil is loaded in the upper and side portions of the envelope and finer foil is loaded near the bottom-center portions of the envelope and about the igniting filament and primer of the lamp. On firing the lamp the fine foil ignites first the generated light comes to a peak after a relatively short time. The coarse foil ignites after the fine foil and the peak of light intensity for the ignition of the coarse foil occurs somewhat later than the light-intensity peak for the fine foil. These two peaks of light combine to provide the focal-plane photoflash lamp with a flash of long duration and relatively uniform intensity and in a No. 6 focal-plane photoflash lamp, for example, the minimum duration at half peak of light intensity is normally about 30 milliseconds. In the usual No. 5 photoflash lamp, in contrast, the minimum duration at half-peak light intensity is normally about 13 milliseconds. In order to achieve consistent results regarding the long and uniform peak, it has been found that the coarse and fine foils must be substantially separate with the finer foil surrounding the igniting filament and primer so that it will ignite first. This problem of separation of the foils of different sizes has, in the past, presented a manufacturing problem for while the coarse foil can readily be loaded by existing foil-loading equipment, this equipment is not adapted to load the fine foil into the same bulb, which in the past has been loaded by hand after the coarse foil has been machine loaded.

It is the general object of the invention to avoid and overcome the foregoing and other difficulties of and objections to prior art practices by the provision of an apparatus for machine loading different sizes of foil for a focal-plane type photoflash lamp.

It is a further object of this invention to provide a method for loading different sizes of foil into a single envelope for a focal-plane type photoflash lamp.

The aforesaid objects of the invention, and other objects which will become apparent as the description proceeds, are achieved by providing an apparatus and method whereby both coarse and fine foils are loaded by vacuum-loading techniques wherein the fine foil is first loaded and the coarse foil is later loaded, the coarse-foil loading tube being bent a critical amount so that the fine foil can be correctly positioned within the envelope.

For a better understanding of the invention reference should be had to the accompanying drawing wherein:

Fig. 1 is a sectional elevational view of a suction-type loading head showing the fine foil loading operation;

Fig. 2 is an elevational view of the photoflash lamp envelope showing the fine foil after loading;

Fig. 3 is a sectional elevational view of the coarse-foil suction type loading head with the fine-foil loaded bulb in position on the head;

Fig. 4 is a sectional elevational view of the coarse-foil loading head during the first stage of the loading operation;

Fig. 5 is an enlarged view taken on the line V—V in Fig. 4;

Fig. 6 is a sectional elevational view of the coarse-foil suction type loading head showing the coarse foil being loaded;

Fig. 7 is an elevational view, partly in section, of the foil loaded bulb;

Fig. 8 is an elevational view of the completed lamp.

Although the principles of the invention are broadly applicable to any type of photoflash lamp or other type of container which encloses foils material of more than one coarseness, the invention is particularly applicable for loading foil into a focal-plane photoflash lamp, and particularly a No. 6 type, and hence it has been so illustrated and will be so described.

With specific reference to the form of the invention illustrated in the drawing, the numeral 10 indicates generally a No. 6 type photoflash bulb (having a volume of 25 cc.) in position on the fine-foil suction type loading head 12 and in the process of being loaded with fine foil 13. This fine foil 13 may be shredded aluminum in the form of ribbons having a thickness of about 0.00052" and a width of about 0.0007". However, magnesium or other suitable material may be used. The head 12 is provided with a loading or inlet tube 14 which projects through the neck of the bulb and terminating within it. The other end of the loading tube 14 is connected to the output of a foil shredding machine, such as illustrated in Patent Number 2,347,046 to W. J. Geiger, which shredding machine is set to produce fine foil. The interior portions of the loading tube 14 and connection conduit 16 should be smooth so as not to entrap any of the fine foil.

The head 12 is attached to the bed or frame 18 of the loading machine and the suction type head may have a generally cylindrical configuration closed at one end with an annular seat portion 20 provided at the other or bulb receiving end. This seat 20 may be of rubber in order to support the envelope or bulb 10 in position on the head and seal it so that a partial vacuum may be maintained within the bulb and within the loading head. A vacuum loading connection pipe 28 connects to the interior of the loading head and is connected to a filter and pumping means, as illustrated in the aforementioned Patent Number 2,347,046 to Geiger.

The outer surface of that part of the loading tube 14 which is adjacent the neck 23 of the bulb 10 when the bulb is in position on the loading head 12 is provided with a restricting means 24 which may take the form of a washer so that only a narrow gap 26 remains between the periphery of the washer 24 and the bulb neck 23. This serves to contain the loaded fine foil 13 within the envelope.

The operation of the fine foil loading head is essentially as described in the aforementioned Geiger patent and briefly the suction means (not shown) causes fine foil to be sucked through the smooth conduit 16, fine-foil loading tube 14 and into the envelope 10. The gas stream created by the suction passes between the restriction 26 created by the washer 24 and the bulb neck 23 and on through the suction means connection pipe 28. Since the fine foil cannot pass the restriction 26 it remains within the envelope; the gap of the restriction may be about 0.029", for example, although this is not critical.

After a sufficient quantity of the fine coil has been loaded into the envelope, which in the case of a No. 6 type lamp may be 13 mg. of fine foil, the suction producing means is shut off and the recurrent flow of gas into the envelope through the restriction 26 causes the fine foil to be distributed throughout the envelope. The fine-foil loaded bulb may then be removed from the loading head 12, as illustrated in Fig. 2.

The fine-foil loaded bulb is then placed upon a coarse-foil suction head 12a as illustrated in Fig. 3, and such a head substantially corresponds to the fine-foil suction head 12 shown in Fig. 1 except that the portion of the coarse-foil loading tube 14a which projects into the envelope 10 is bent at an angle of at least 5 degrees and not more than 10 degrees with respect to the axis of the envelope, with the optimum bend for the coarse-foil loading tube 14a being 8 degrees with respect to the axis of the envelope.

The coarse-foil suction head 12a is connected to a second suction producing means through pipe 28a, such suction means being substantially as illustrated in the aforementioned Geiger patent. The loading tube 14a is connected through a smooth conduit 16a to a foil shredding machine as illustrated in the aforementioned Geiger patent, which machine is set to produce coarse foil. When the suction producing means is turned on as illustrated in Fig. 4 the fine foil 13 is sucked down until it is adjacent the restriction 26a between the washer 24a and the envelope neck, see Figs. 4 and 5. If the amount of bend for the coarse-foil loading tube extremity which projects beyond the washer 24a into the envelope 10 is less than 5 degrees with respect to the envelope axis it has been found that the fine foil will tend to catch on the end of the loading tube and also be displaced to the side and substantially all of the loaded fine foil will not be sucked down to a position which is adjacent the lamp neck as illustrated in Fig. 4. Also the coarse foil may not be loaded directly on top of the fine foil, as is desired. If all of the fine foil is not sucked down to this central position, some of the fine foil will be admixed with the coarse foil or positioned to one side of the envelope after the loading is complete and the flash produced by the lamp will be variable depending upon the amount of foil admixture and the relative positioning of the fine and the coarse foils. If the amount of bend of the extremity of the coarse foil loading tube 14a which projects within the envelope is greater than 10 degrees, some difficulty may be experienced in loading the lamp onto the coarse foil loading head.

After the fine foil has been sucked to a position adjacent the envelope neck and restriction 26a as illustrated in Fig. 4, the coarse foil shredding machine is turned on and the coarse foil 29 is sucked into the envelope to a position above the fine foil. In the case of a No. 6 type focal plane photoflash lamp, it has been found that 35 mg. of coarse foil are satisfactory and after this amount of coarse foil has been loaded the coarse-foil shredding machine is turned off and the suction producing means is also turned off. In the case of a No. 6 lamp the shredded aluminum coarse foil may have a thickness of about 0.0012" and a width of about 0.0018". When the suction producing means is turned off, the recurrent flow of gas into the envelope will cause the fine foil and the coarse foil to snap into position as illustrated in Fig. 7 and, as there shown, the two different sizes of foil are substantially separated from one another with the smaller size foil in a centered position and closest to the envelope neck.

The mount 30 carrying the lead conductors 32, filament 34 and primer 35 are then sealed to the envelope neck and an oxygen gas-fill inserted into the envelope by techniques which are well-known. The base 36 is then cemented to the envelope neck and the lead conductors 32 are electrically conducted to the base to complete the fabrication of the lamp, a completely fabricated lamp being illustrated in Fig. 8. When the mount 30 carrying the filament 34 is inserted into the envelope, the filament will contact the centrally located fine foil so that the primer 35 will be surrounded by the fine foil which will be bunched about the primer and filament in a radius of about 3/8", in the case of a No. 6 type lamp, for example.

As is well-known, the envelope 10 may be provided with both an internal and an external coating of protective lacquer in order to provide against violent envelope eruption against the thermal and mechanical shocks generated by the actinic reaction. In this case the internal lacquer coating may be of a heat resistant acrylic resin, which is applied before the foil is introduced into the lamp and the external lacquer coating may be of a high tensile strength cellulose acetate, which is applied after the lamp is completely fabricated. Alternatively, the internal and external lacquer may be replaced by a single coating of external lacquer such as cellulose-acetate butyrate, which is applied by dipping after the lamp is completely fabricated. Also, as is well-known, the inwardly extending extremities of the lead-in conductors 32 carry a small amount such as about 1 milligram of primer material 35 consisting of 90% zirconium and 10% potassium perchlorate and the envelope encloses an oxygen gas-fill at a pressure of about 600 mm. mercury, for example.

It will be recognized that the objects of the invention have been achieved by providing a method and apparatus for machine loading foil of different sizes into the envelope of a photoflash lamp which is particularly adapted for use with focal-plane type cameras. Also provided have been an allowable and an optimum degree of bend for the coarse foil loading tube, which bend allows the coarse foil to be machine loaded.

While in accordance with the patent statutes one best known embodiment of the invention has been illustrated and described in detail, it is to be particularly understood that the invention is not limited thereto or thereby.

I claim:

1. The method of filling a photoflash lamp envelope having an open neck centered about the envelope axis with shredded foil of two different sizes so that the different sizes of foil are substantially separated from one another with the smaller size foil closest to the envelope neck, comprising placing said envelope over a fine-foil loading tube so that said tube projects through said open neck into said envelope, carrying fine foil into said envelope through said tube by a stream of gas leaving said envelope between said neck and said tube, removing said envelope from said fine foil loading tube, placing said fine-foil loaded envelope over a coarse foil loading tube so that said coarse foil loading tube projects through said neck into said envelope, the portion of said coarse-foil loading tube which projects into said envelope being bent at least 5° and not more than 10° with respect to the axis of said envelope, forcing said fine foil to a position adjacent said envelope neck by a gas stream through said tube leaving said envelope between said neck and said coarse-foil loading tube, carrying coarse foil into said envelope through said coarse-foil loading tube by a gas stream leaving said envelope between said neck and said tube, distributing said shredded foil as uniformly as possible throughout said envelope by the recurrent flow of gas therein, and removing said envelope from said coarse foil loading tube.

2. The method of filling a photoflash lamp envelope with relatively coarse shredded foil which envelope has an open neck centered about the envelope axis and a filling of relatively fine shredded foil, so that the different sizes of foil are substantially separated from one another with the finer size foil closest to the envelope neck, comprising placing a coarse-foil loading tube through said neck into said envelope, the portion of said coarse-foil loading tube which projects into said envelope being bent at least 5° and not more than 10° with respect to the axis of said envelope, forming said fine foil filling to a position adjacent said envelope neck by means of a gas stream leaving said envelope between said neck and said coarse-foil loading tube, carrying coarse foil into said envelope through said coarse-foil loading tube by means of a gas stream leaving said envelope between said neck and said tube, distributing said shredded foil as uniformly as possible throughout said envelope by the recurrent flow of gas therein, and removing said coarse-foil loading tube from said neck.

3. The method of filling a photoflash lamp envelope having an open neck centered about the envelope axis with shredded foil of two different sizes so that the different sizes of foil are substantially separated from one another with the smaller size foil closest to the envelope neck, comprising placing said envelope over a fine-foil loading tube so that said tube projects through said open neck into said envelope, carrying fine foil into said envelope through said tube by a stream of gas leaving said envelope between said neck and said tube, removing said envelope from said fine-foil loading tube, placing said fine-foil loaded envelope over a coarse foil loading tube so that said coarse foil loading tube projects through said neck into said envelope, the portion of said coarse-foil loading tube which projects into said envelope being bent about 8° with respect to the axis of said envelope, forcing said fine foil to a position adjacent said envelope neck by a gas stream through said tube leaving said envelope between said neck and said coarse-foil loading tube, carrying coarse foil into said envelope through said coarse-foil loading tube by a gas stream leaving said envelope between said neck and said tube, distributing said shredded foil as uniformly as possible throughout said envelope by the recurrent flow of gas therein, and removing said envelope from said coarse foil loading tube.

4. An apparatus for filling a photoflash envelope having an open neck centered about the envelope axis with shredded foil of two different sizes so that the different sizes of foil are substantially separated from one another with the smaller foil closest to the envelope neck, said apparatus comprising a first suction head having an annular seat portion adapted to support and seal an envelope for vacuum loading, a smooth feeding conduit connected to a fine-foil shredding machine and terminating in a fine-foil feeding tube adapted to project through said envelope neck within said envelope when in vacuum loading position, first controllable vacuum producing means for producing a partial vacuum within said suction head to create a gas flow capable of carrying said fine foil from said fine-foil shredding machine, through said feed conduit, said loading tube, into said envelope and between said envelope neck and said loading tube into said suction head, restricting means between said neck and said loading tube to substantially prevent said fine foil being carried by said gas flow from said envelope into said suction head so that on cessation of gas flow said fine foil will be distributed within said envelope by the recurrent flow of gas therein, a second suction head having an annular seat portion adapted to support and seal said fine-foil loaded envelope for vacuum loading, a smooth feeding conduit connecting to a coarse-foil shredding machine and terminating in a coarse-foil loading tube adapted to project through said neck within said envelope when in loading position, the portion of said coarse-foil loading tube which projects into said envelope being bent at least 5° and not more than 10° with respect to the envelope axis, second controllable vacuum producing means for producing a partial vacuum within said second suction head to create a gas flow capable of carrying coarse foil from said coarse-foil shredding machine, through said coarse-foil feed conduit, said coarse-foil loading tube, into said fine-foil loaded envelope and between said envelope neck and said coarse-foil loading tube into said second suction head, second suction head restricting means between said neck and said coarse-foil loading tube to substantially prevent said shedded foil being carried by said gas flow from said envelope into said second suction head so that on cessation of said gas flow said loaded foil will be distributed within said envelope by the recurrent flow of gas therein.

5. An apparatus for filling a photoflash envelope with relatively coarse foil, which envelope has an open neck centered about the envelope axis and a filling of relatively fine shredded foil, so that the different sizes of foil are substantially separated from one another with the smaller foil closest to the envelope neck, said apparatus comprising a suction head having an annular seat portion adapted to support and seal said fine-foil loaded envelope for vacuum loading, a smooth feeding conduit connecting to a coarse-foil shredding machine and terminating in a coarse-foil loading tube adapted to project through said neck within said envelope when in loading position, the portion of said coarse-foil loading tube which projects into said envelope being bent at least 5° and not more than 10° with respect to the envelope axis, controllable vacuum producing means for producing a partial vacuum within said suction head to create a gas flow capable of carrying coarse foil from said coarse-foil shredding machine, through said coarse-foil feed conduit, said coarse-foil loading tube, into said fine-foil loaded envelope and between said envelope neck and said coarse-foil loading tube into said suction head, suction head restricting means between said neck and said coarse-foil loading tube to substantially prevent said shredded foil being carried by said gas flow from said envelope into said suction head so that on cessation of said gas flow the loaded foil will be distributed within said envelope by the recurrent flow of gas therein.

6. An apparatus for filling a photoflash envelope having an open neck centered about the envelope axis with shredded foil of two different sizes so that the different sizes of foil are substantially separated from one another with the smaller foil closest to the envelope neck, said apparatus comprising a first suction head having an annular seat portion adapted to support and seal an envelope for vacuum loading, a smooth feeding conduit connected to a fine-foil shredding machine and terminating in a fine-foil feeding tube adapted to project through said envelope neck within said envelope when in vacuum loading position, first controllable vacuum producing means for producing a partial vacuum within said suction head to create a gas flow capable of carrying said fine-foil from said fine-foil shredding machine, through said feed conduit, said loading tube, into said envelope and between said envelope neck and said loading tube into said suction head, restricting means between said neck and said loading tube to substantially prevent said fine-foil being carried by said gas flow from said envelope into said suction head so that on cessation of said gas flow said fine-foil will be distributed within said envelope by the recurrent flow of gas therein, a second suction head having an annular seat portion adapted to support and seal said fine-foil loaded envelope for vacuum loading, a smooth feeding conduit connecting to a coarse-foil shredding machine and terminating in a coarse-foil loading tube adapted to project through said neck within said envelope when in loading position, the portion of said coarse-foil loading tube which projects into said envelope being bent about 8° with respect to the envelope axis, second controllable vacuum producing means for producing a partial vacuum within said second suction head to create a gas flow capable to carrying coarse foil from said coarse-foil shredding machine, through said coarse-foil feed conduit, said coarse-foil loading tube, into said fine-soil loaded envelope and between said envelope neck and said coarse-foil loading tube into said second suction head, second suction head restricting means between said neck and said coarse-foil loading tube to substantially prevent said shredded foil being carried by said gas flow from said envelope into said second suction head so that on cessation of said gas flow the loaded foil will be distributed within said envelope by the recurrent flow of gas therein.

7. The method of filling a photoflash lamp envelope having an open neck centered about the envelope axis with shredded foil of two different sizes so that the different sizes of foil are substantially separated from one another with the smaller size foil closest to the envelope neck, comprising placing said envelope over a fine-foil loading tube so that said tube projects through said open neck into said envelope, carrying fine foil into said envelope through said tube by a stream of gas leaving said envelope between said neck and said tube, removing said envelope from said fine foil loading tube, placing said fine-foil loaded envelope over a coarse foil loading tube so that said coarse foil loading tube projects through said neck into said envelope, the portion of said coarse-foil loading tube which projects into said envelope being bent at least 5° with respect to the axis of said envelope and not more than an amount which will allow said envelope to be placed over said coarse-foil loading tube, forcing said fine foil to a position adjacent said envelope neck by a gas stream through said tube leaving said envelope between said neck and said coarse-foil loading tube, carrying coarse foil into said envelope through said coarse-foil loading tube by a gas stream leaving said envelope between said neck and said tube, distributing said shredded foil as uniformly as possible throughout said envelope by the recurrent flow of gas therein, and removing said envelope from said coarse foil loading tube.

8. An apparatus for filling a photoflash envelope having an open neck centered about the envelope axis with shredded foil of two different sizes so that the different sizes of foil are substantially separated from one another with the smaller foil closest to the envelope neck, said apparatus comprising a first suction head having an annular seat portion adapted to support and seal an envelope for vacuum loading, a smooth feeding conduit connected to a fine-foil shredding machine and terminating in a fine-foil feeding tube adapted to project through said envelope neck within said envelope when in vacuum loading position, first controllable vacuum producing means for producing a partial vacuum within said suction head to create a gas flow capable of carrying said fine foil from said fine-foil shredding machine, through said feed conduit, said loading tube, into said envelope and between said envelope neck and said loading tube into said suction head, restricting means between said neck and said loading tube to substantially prevent said fine foil being carried by said gas flow from said envelope into said suction head so that on cessation of gas flow said fine foil will be distributed within said envelope by the recurrent flow of gas therein, a second suction head having an annular seat portion adapted to support and seal said fine-foil loaded envelope for vacuum loading, a smooth feeding conduit connecting to a coarse-foil shredding machine and terminating in a coarse-foil loading tube adapted to project through said neck within said envelope when in loading position, the portion of said coarse-foil loading tube which projects into said envelope being bent at least 5° with respect to the axis of said envelope and not more than an amount which will allow said envelope to be loaded into said second suction head, second controllable vacuum producing means for producing a partial vacuum within said second suction head to create a gas flow capable of carrying coarse foil from said coarse-foil shredding machine, through said coarse-foil feed conduit, said coarse-foil loading tube, into said fine-foil loaded envelope and between said envelope neck and said coarse-foil loading tube into said second suction head, second suction head restricting means between said neck and said coarse-foil loading tube to substantially prevent said shredded foil being carried by said gas flow from said envelope into said second suction head so that on cessation of said gas flow said loaded foil will be distributed within said envelope by the recurrent flow of gas therein.

No references cited.